United States Patent [19]

McKee et al.

[11] Patent Number: 4,638,720
[45] Date of Patent: Jan. 27, 1987

[54] ELECTRO-HYDRAULIC CONTROL SYSTEM

[75] Inventors: Kevin D. McKee, Waterloo; Charles W. Formwalt, Jr., Janesville, both of Iowa

[73] Assignee: Deere & Company, Moline, Ill.

[21] Appl. No.: 211,486

[22] Filed: Dec. 1, 1980

[51] Int. Cl.$^4$ .............................................. F15B 11/00
[52] U.S. Cl. ........................................ 91/522; 91/527; 91/529; 91/530
[58] Field of Search ................... 91/522, 527, 529, 530

[56] References Cited

U.S. PATENT DOCUMENTS

| | | | |
|---|---|---|---|
| 2,732,860 | 1/1956 | Ray | 137/623 |
| 2,775,982 | 1/1957 | Canfield | 137/620 |
| 3,026,892 | 3/1962 | Tsien | 137/82 |
| 3,155,365 | 11/1964 | Hartung et al. | 251/25 |
| 3,283,784 | 11/1966 | Ruchser | 137/625.64 |
| 3,491,982 | 1/1970 | Alcester . | |
| 3,512,453 | 5/1970 | Balzer | 91/529 |
| 3,556,154 | 1/1971 | Kramer . | |
| 3,598,148 | 8/1971 | Kroffke . | |
| 3,735,781 | 5/1973 | Kesti . | |
| 3,750,705 | 8/1973 | Blumer . | |
| 3,817,153 | 6/1974 | Zunzer | 91/529 |
| 3,827,668 | 8/1974 | DeVries | 91/529 |
| 4,014,509 | 3/1977 | Yoshino et al. . | |
| 4,046,165 | 9/1977 | Rose, Sr. et al. . | |
| 4,194,719 | 3/1980 | Ewald et al. . | |
| 4,212,165 | 7/1980 | Zirps | 91/530 |

FOREIGN PATENT DOCUMENTS

| | | | |
|---|---|---|---|
| 2038661 | 2/1972 | Fed. Rep. of Germany | 91/527 |
| 2360530 | 6/1975 | Fed. Rep. of Germany | 91/530 |

*Primary Examiner*—Abraham Hershkovitz

[57] ABSTRACT

An electro-hydraulic control system includes a plurality of two-position control valves, each controlling fluid flow into and out of a corresponding one of a plurality of hydraulic functions. First and second pressure responsive servo actuators associated with each control valve operate to move each control valve to first and second positions, respectively. A two-position, solenoid-operated, pilot valve controls fluid flow into and out of a pilot circuit. The pilot circuit communicates fluid to and from the second servo actuator of each control valve and to and from a plurality of two-position, soleniod-operated, pilot valves. Each pilot valve controls fluid flow into and out of the first servo actuator of a corresponding one of the control valves. A detent mechanism holds each control valve in either its first or its second position in the absence of fluid pressure in the servo actuators. A particular hydraulic function may be actuated by momentary energization of particular solenoids of the rest and/or the pilot valves.

12 Claims, 3 Drawing Figures

4,638,720

ELECTRO-HYDRAULIC CONTROL SYSTEM

BACKGROUND OF THE INVENTION

The present invention relates generally to an electro-hydraulic control system for a hydraulic system, and more particularly relates to an interface between a hydraulic system and an electronic controller.

When controlling a hydraulic system with electrical signals, it is common practice to make the system control valves pressure responsive and control their movement through the use of solenoid operated pilot valves. However, all of these systems have had one or more limitations which are unacceptable in some applications. For example, many systems required two solenoid pilot valves for each control valve employed in the system and others required a constant electrical current applied to the solenoid pilot valves in order to maintain control valve position. Those systems requiring two solenoid pilot valves for each control valve could be prohibitive in cost and were often unreliable due to the number of solenoids, which are the most unreliable elements in the system. Those systems requiring constant electrical current to maintain control valve spool position are unreliable, since the constant current creates excessive heat, which tends to deteriorate the solenoid. Systems requiring a constant electrical current to maintain control valve position also present a safety hazard in that in the event of an electrical failure condition such as a power failure, or short or open circuit condition, the condition of the control valves would change unexpectedly. An example as to how this could be a definite safety hazard would be in the control of a planetary transmission with hydraulically controlled brakes and clutches to establish the different speed ratios. If the transmission and engine were being used to provide a braking force while traveling down a hill, a loss of electrical power could cause the transmission to shift into neutral, resulting in a loss of the braking force.

In some electro-hydraulic control systems, it was possible to operate one or more solenoid pilot valves when another was inoperative, due to a short circuit in the control wires or a defective solenoid. This also created a safety hazard in that it was possible to wind up with a hydraulic system condition which is other than that asked for by the operator.

SUMMARY OF THE INVENTION

An object of the present invention is to provide an interface between an electronic controller and a hydraulic system which uses a minimum number of solenoid valves and is safe in operation.

A further object of the present invention is to provide an electro-hydraulic control system in which the number of solenoid pilot valves is one more than the number of hydraulic system control valves and in which the solenoid pilot valves are only momentarily operated.

A still further object of the present invention is to provide an electro-hydraulic control system for a hydraulic system in which the control valves are mechanically held in a selected position and moved between the selected positions by solenoid pilot valves and in which the number of solenoid pilot valves is equal to one plus the number of control valves.

Yet another object of the present invention is to provide an electro-hydraulic control system with a solenoid pilot valve arrangement making it possible to check the operation of each solenoid pilot valve before any change is made in the hydraulic system.

The above and additional objects and advantages of the present invention will become apparent to those skilled in the art from a reading of the following detailed description, when taken in conjunction with the accompanying drawings.

DESCRIPTION OF THE PREFERRED EMBODIMENT

Figure 1:
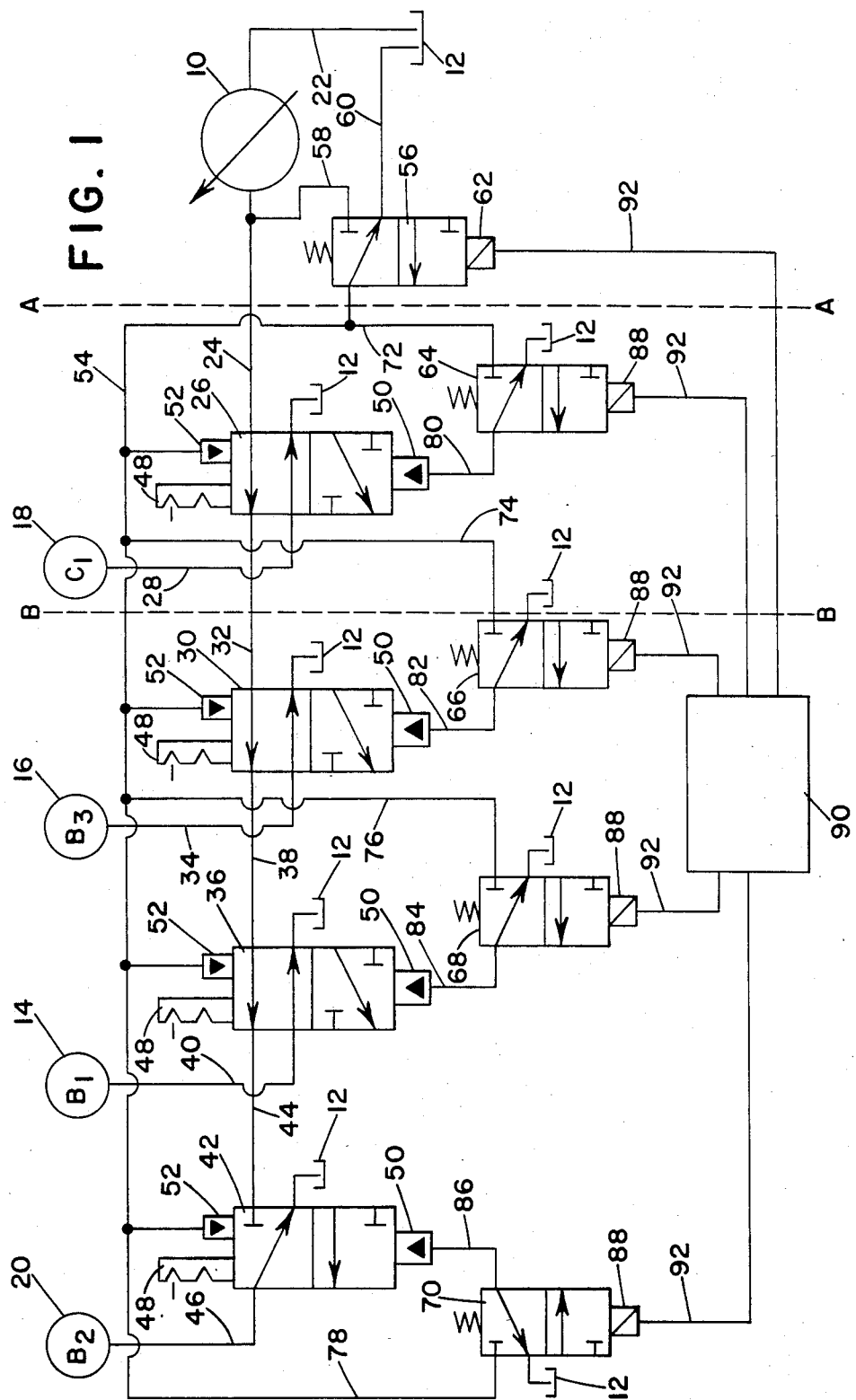
FIG. 1 is a a schematic illustration of a hydraulic system with an electro-hydraulic control system according to the present invention.

Referring to FIG. 1 of the drawings, an exemplary hydraulic system in which the control system according to the present invention is useful includes a source of fluid pressure or hydraulic pump 10, a fluid reservoir 12 and a plurality of hydraulic functions 14, 16, 18 and 20. By way of example only, the electrohydraulic control system according to the present invention is useful in a hydraulic system for controlling a planetary transmission, such as that shown in U.S. Pat. No. 4,077,282, which issued on Mar. 7, 1978, to James Henry Kress. In the transmission illustrated in U.S. Pat. No. 4,077,282, a first forward speed is obtained by hydraulically engaging a first brake, a second forward speed is obtained by hydraulically engaging a third brake, a third forward speed is obtained by hydraulically engaging a clutch and a reverse speed is obtained by hydraulically engaging a second brake. The hydraulic functions 14–20 illustrated in FIG. 1 have been labeled as B1, B3, C1 and B2 to illustrate how the FIG. 1 hydraulic system could be utilized to control the transmission in U.S. Pat. No. 4,077,282.

In the illustrated hydraulic system, the pump 10 draws a fluid from the reservoir 12 through a fluid line 22 and then delivers fluid under pressure through a fluid line 24 to a first control valve 26. The control valve 26 is a two-position valve which, in a first position, delivers fluid from the fluid line 24 to the function 18 via a fluid line 28. In a second position, illustrated, the valve 26 delivers the fluid pressure from the fluid line 24 to a second two-position control valve 30 via a fluid line 32 and at the same time establishes communication between the fluid line 28 and the reservoir 12. In a first position, the control valve 30 routes the fluid pressure from the line 32 to the function 16 via a fluid line 34. In the second position, illustrated, the valve 30 routes the fluid pressure from the line 32 to a third two-position control valve 36 via a fluid line 38 and at the same time establishes communication between the fluid line 34 and the reservoir 12. In a first position, the valve 36 routes fluid under pressure from the line 38 to the function 14 via a fluid line 40 and in a second position, illustrated, routes the fluid under pressure from the line 38 to a two-position control valve 42 via a fluid line 44 while at the same time establishes communication between the fluid line 40 and the reservoir 12. In a first position, the control valve 42 routes fluid under pressure from the line 44 to the function 20 via a fluid line 46 and in a second position, illustrated, blocks the fluid line 44 and establishes communication between the fluid line 46 and the reservoir 12.

As should be clearly apparent by those skilled in the art, it is not necessary that each of the valves 26, 30 and 36 route fluid to the next succeeding valve when in the second position. Each of the control valves 26, 30, 36 and 42 could be connected directly to the fluid line 24 and the valves 26, 30 and 36 be constructed like the valve 42 so that when in the second position, they blocked the flow of pressurized fluid. This would be desirable in a system where two or more hydraulic functions needed to be operated simultaneously.

Each of the control valves 26, 30, 36 and 42 is provided with a detent mechanism 48 which will yieldably hold the control valve in its first or second position. Each of the control valves is also provided with first and second servo means 50 and 52, which are responsive to fluid pressure to move the control valve to its first and second positions, respectively. For a reason which will become more apparent hereinafter, the first servo means 50 of each control valve is of a larger size than the second servo means 52 so that if both servo means are subjected to the same fluid pressure, the valve will move to its first position.

The second servo means 52 of each control valve 26, 30, 36 and 42 is in direct communication with a pilot circuit or fluid line 54. Fluid pressure in the pilot circuit is controlled by a two-position valve 56 which is connected to the pump output by a fluid line 58. Valve 56, which will hereinafter be referred to as the reset valve, is a solenoid-actuated valve normally biased to a position in which it connects the pilot circuit 54 with the reservoir 12 through a fluid line 60 and, upon energization of its solenoid 62, is moved to a position where it interconnects the pump output with the pilot circuit 54 via the fluid line 58.

The pilot circuit 54 is also connected to one side of each of the pilot valves 64, 66, 68 and 70 via fluid lines 72, 74, 76 and 78, respectively. The second side of the pilot valves 64–70 are connected to the first servo means 50 of the control valves 26, 30, 36 and 42, respectively, via fluid lines 80, 82, 84 and 86, respectively. Each of the pilot valves 64–70 is normally biased to a position, illustrated, in which it blocks fluid flow from the pilot circuit 54 to its respective servo means and connects its respective servo means to the reservoir 12. Each of the pilot valves 64–70 is controlled by a solenoid 88 which, when energized, moves the pilot valve to a position in which it establishes communication between the pilot circuit 54 in its respective servo means 50.

Each of the solenoids 62 and 88 is connected to a suitable controller 90 by leads 92. The controller 90 does not form part of the present invention and can be no more than simple switches to connect the solenoids to an electrical source or can be a complicated electronic controller responsive to a desired input signal to energize proper solenoids.

The operation of the hydraulic system illustrated in FIG. 1 will be described as though it is controlling the transmission illustrated, described and claimed in U.S. Pat. 4,077,282. With the pump 10 operating and all the valves in the position illustrated in FIG. 1, the fluid lines 24, 32, 38, 44 and 58 will all be pressurized, but the transmission will be in a neutral condition since all of the functions or brakes and clutches, B1, B2, B3 and C1, are connected to the reservoir 12 through their respective control valves. To establish a first speed ratio, it is only necessary to engage clutch B1 by pressurizing function 14. This is accomplished by momentarily and simultaneously energizing solenoid 62 for reset valve 56 and solenoid 88 for valve 68. With the solenoid 62 energized, reset valve 56 moves to a position interconnecting pilot circuit 54 with fluid line 58 so that fluid pressure from the pump 10 flows to the second servo means 52 of each of the valves 26, 30, 36 and 42 and tends to hold them in their illustrated second position. However, with the solenoid 88 for the valve 68 energized, fluid pressure from the pilot circuit 54 flows through fluid lines 76 and 84 to the first servo means 50 of the control valve 36. Since the first servo means 50 is larger than the second servo means 52, the first servo means 50 will overpower the second servo means 52 and detent mechanism 48 to move the control valve 36 to its first position so that the function 14 is connected to the pump 10 and the brake B1 is engaged. The solenoids 62 and 88 for the reset valve 56 and valve 68 are only energized long enough to cause a shifting of the control valve 36 since the detent mechanism 48 will hold the control valve 36 in its first position. The detent mechanism 48 will hold control valve 36 in this first position despite the fact that valves 56 and 68 return to their initial, illustrated positions, wherein reservoir pressure is once again present in pilot circuit 54 and fluid lines 76 and 68. This momentary energization of the solenoids 62 and 88 aids in the life of the solenoids since it will not cause overheating, which deteriorates the solenoids.

To shift the transmission from a first speed ratio to a reverse speed ratio, it is necessary to disengage brake B1 and engage brake B2. This is accomplished by momentarily energizing solenoid 62 and the solenoid 88 for pilot valve 70. With the solenoid 62 energized, the reset valve 56 provides communication between the pilot circuit 54 and the pump 10 so that fluid pressure in the second actuator 52 of the valve 36 overpowers the detent mechanism 48 and moves the valve 36 to the illustrated second position, wherein the function 14 is connected to the reservoir 12 through the fluid line 40. With the solenoid 88 for the pilot valve 70 energized, the pilot circuit 54 is also connected to the first servo means 50 of the control valve 42 via fluid line 78 and 86. Because the first servo means 50 is larger than the second servo means 52, the first servo means 50 overpowers the second servo means 52 and detent 48 to shift the control valve 42 to its first position and connect the pump 10 to the function 20 via fluid lines 24, 32, 38, 44 and 46.

Second and third transmission speed ratios can be established in like manner by engaging the brake B3 and clutch C1 respectively. Brake B3 is engaged by a momentarily and simultaneously energizing solenoid 62 and the solenoid 88 for valve 66. Clutch C1 is engaged by momentarily and simultaneously energizing solenoid 62 and the solenoid 88 for pilot valve 64.

From the foregoing description of construction and operation, the advantages of the electro-hydraulic control system of the present invention should be readily apparent. The solenoid life advantage of having momentary energization of the various solenoids has previously been pointed out. But it should also be noted that, since the solenoid is only momentarily energized and the control valve held in position by the detent means, a power failure due to a short circuit or the like will not result in a change in transmission condition.

It should also be apparent that the number of solenoid valves is kept at a minimum by employing one solenoid for each control valve to move the control valve to a first or active position and utilizing a single reset solenoid valve to move all of the control valves to its second or neutral position. This is accomplished through the use of the unequal sized servo means on the control valves.

By having the reset valve 56 control fluid pressure in the pilot circuit 54 and the pilot valves 64, 66, 68 and 70 control the flow of fluid pressure from the pilot circuit 54 to the first servo means 50, an additional advantage is obtained. Specifically, it is possible to utilize an electronic controller 90 which has built-in logic which will prevent any change in condition of the hydraulic system, or speed ratio of the controlled transmission, unless the pilot valves 56, 64, 66, 68 and 70 are all operational. This would be accomplished by the controller providing a pulse to the solenoids 88 to check for a short circuit or the like prior to the time a pulse is sent to the solenoid 62. Energization of solenoids 88 without energization of solenoid 62 will not affect the condition of the hydraulic system since the pilot circuit 54 will not be pressurized. If the solenoids 88 are all operational, the control pulse may then be sent to the solenoid 62 and the desired solenoid 88. If the solenoid 62 is not operational, fluid pressure would be blocked from the pilot circuit 54 so the energization of one of the solenoids 88 would not affect the condition of the hydraulic system. The importance of this feature can be readily understood in the transmission example, if it is assumed that the transmission was in a vehicle traveling down a hill and the operator desired to shift from the third speed ratio to the second speed ratio to increase the braking effort provided by the vehicle engine. If an energizing signal was provided to the solenoid 62 and the solenoid 88 for the valve 66 to affect the desired transmission shift and the solenoid 88 was short circuited for some reason, energization of the solenoid 62 would cause pressurization of the pilot circuit 54 and move all of the control valves to their second or neutral position. This would put the transmission in a neutral condition and all braking effort from the vehicle engine would be lost.

Figure 2:
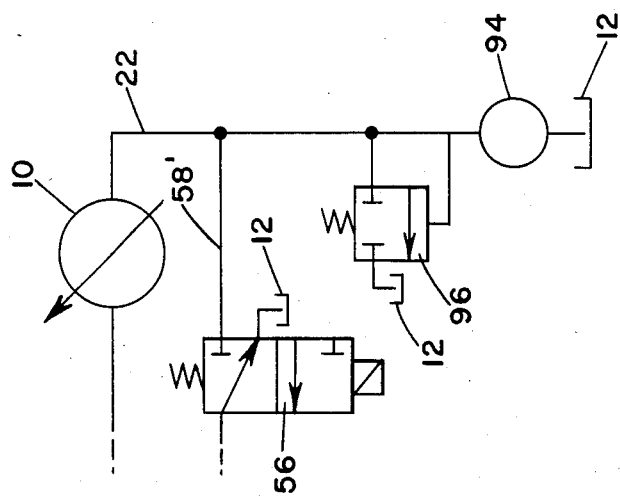
FIG. 2 is a modification of that portion of the hydraulic system illustrated in FIG. 1 which is to the right of the broken line a—a.

Referring now to FIG. 2, a slightly modified hydraulic system is illustrated wherein a charge pump 94 draws fluid from the reservoir 12 and provides the same to the main pump 10 through the fluid line 22. A pressure-limiting valve 96 limits the pressure in the fluid line 22. In the FIG. 2 embodiment, the reset valve 56 is connected to the fluid line 22 by a fluid line 58' rather than to the output of pump 10 as in the FIG. 1 embodiment. However, since the operating pressure of the pilot circuit with respect to the operating pressure of the main hydraulic circuit is not important to the invention, the pumps 10 and 94 can be considered as a simple source of pressurized fluid. As will be apparent to those skilled in the art, the FIG. 2 embodiment will operate in exactly the same manner as the FIG. 1 embodiment, except that the pilot circuit 54 of FIG. 2 will be operated at a lower pressure than the functions of the FIG. 2 embodiment.

Figure 3:
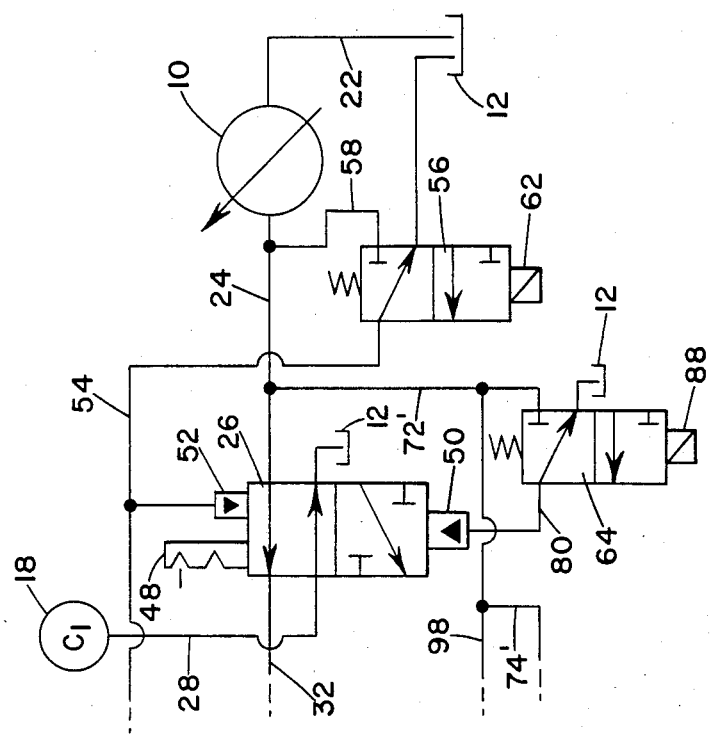
FIG. 3 is a further modification of the hydraulic system illustrated in FIG. 1 with only that portion to the right of the broken line b—b in FIG. 1 illustrated.

Still another embodiment of the present invention is illustrated in FIG. 3. In the FIG. 3 embodiment, the first servo means 50 of the control valves are controlled independently of the second servo means 52. Specifically, the first side of the pilot valves 64, 66, 68 and 70 are not connected to the pilot circuit 54, but are connected directly to the pump 24. For example, the pilot valve 64 is connected to the fluid line 24 by a fluid line 72'. A branch line 98 extends from fluid line 72' to connect the other pilot valves 66, 68 and 70 to the fluid line 24. For example, fluid line 98 is connected to the pilot valve 66 by a fluid line 74'.

Only that portion of the FIG. 3 embodiment which would correspond to the FIG. 1 embodiment to the right of the line b—b is illustrated since a full illustration would be repetitious.

The embodiment illustrated in FIG. 3 operates similar to the FIG. 1 embodiment in that the reset valve 56 and one additional pilot valve is operated to change conditions in the system and the solenoids are only momentarily energized. However, the FIG. 3 embodiment would not provide the advantage of being able to check the operation of all the solenoids prior to effecting a change in the system since the pilot valves 64, 66, 68 and 70 do not control the flow of pressurized fluid from the pilot circuit 54 to the first servo means 50, and therefore pulsation of only solenoids 88 would cause the pilot valves to apply pump pressure to the first servo means 50 even though only reservoir pressure exists in pilot circuit 54.

Having described some preferred embodiments of the present invention, other modifications within the spirit and scope of the invention will become apparent to those skilled in the art and can be made without departing from the underlying principles of the invention. For example, the fluid line 72' and 58 in the FIG. 3 embodiment could be connected to a charge pump circuit as in the FIG. 2 embodiment, rather than to the main pump. Also, in the FIG. 3 embodiment, it would be possible to connect the fluid line 58 to a charge pump circuit while the fluid line 72' remains connected to the main pump. This would provide unequal pressure to the servo means 50 and 52 and the servo means could then be made of equal size. Therefore, the invention should not be limited to the specific illustrations and description, but only by the reasonable scope of the following claims.

We claim:

1. An electro-hydraulic control system for a hydraulic system having a plurality of functions, the control system comprising:

a plurality of two-position control valves for controlling the flow of fluid to and exhaust of fluid from the plurality of hydraulic functions;

first and second servo means associated with each control valve responsive to fluid pressure to move the control valve to first and second positions, respectively;

a two-position, solenoid-operated, reset valve for controlling the flow of fluid to and exhaust of fluid from the second servo means of the plurality of control valves; and a two-position, solenoid-operated, pilot valve associated with each control valve for controlling the flow of fluid to and exhaust of fluid from the first servo means of the associated control valve.

2. The electro-hydraulic control system set forth in claim 1 wherein each control valve includes detent means for holding the control valve in the first and second positions in the absence of fluid pressure in the servo means.

3. An electro-hydraulic control system for a hydraulic system having a plurality of hydraulic functions, the control system comprising:

a plurality of two-position control valves for controlling the flow of pressurized fluid to and exhaust of fluid from the hydraulic functions;

first and second servo means associated with each control valve responsive to fluid pressure to move the control valve to first and second positions, respectively, the first servo means associated with each control valve being of a larger size than the second servo means;

detent means associated with each control valve for holding the control valve in the first and second positions in the absence of fluid pressure in the servo means;

a solenoid-operated pilot valve associated with each control valve for controlling the flow of pressurized fluid to and exhaust of fluid from the first servo means of the associated control valve; and a solenoid-operated reset valve for controlling the flow of fluid to and exhaust of fluid from the second servo means of the plurality of control valves and the pilot valves.

4. An electro-hydraulic control system for a hydraulic system having a source of fluid pressure, a fluid reservoir, and a plurality of hydraulic functions, the control system comprising:

a plurality of two-position control valves providing communication between the source and functions when in a first position and between the reservoir and functions when in a second position;

first and second servo means associated with each control valve responsive to fluid pressure to move the associated control valve to its first and second positions, respectively, the first servo means being of a larger size than the second servo means;

detent means associated with each control valve for holding the control valve in the first and second positions in the absence of fluid pressure in the servo means;

fluid transfer means communicating with the second servo means of each control valve;

a two-position, solenoid-operated, reset valve providing communication between the source and fluid transfer means when in a first position and between the fluid transfer means and the reservoir when in the second position; and a two-position, solenoid-operated, pilot valve associated with each control valve providing communication between the fluid transfer means and the first servo means of the associated control valve when in a first position and between the first servo means of the associated control valve and the reservoir when in a second position.

5. An electro-hydraulic control system as set forth in claim 4 wherein the pilot valves and reset valve are each biased to its second position, each includes a solenoid, and each is moved to its second position upon energization of its solenoid.

6. An electro-hydraulic control system as set forth in claim 4 or 5 wherein the servo means are subjected to the same fluid pressure as the hydraulic functions when their respective valves are in the first positions.

7. An electro-hydraulic control system as set forth in claim 4 or 5 wherein the servo means are subjected to a fluid pressure less than the fluid pressure to which the hydraulic functions are subjected when their respective valves are in the first positions.

8. An electro-hydraulic control system for a hydraulic system having a source of fluid pressure, a fluid reservoir and a plurality of hydraulic functions, the control system comprising:

a plurality of two-position control valves providing communication between the source and functions when in a first position and between the functions and reservoir when in a second position;

first and second servo means associated with each control valve responsive to fluid pressure to move the associated control valve to its first and second positions, respectively;

a two-position, solenoid-operated, pilot valve associated with each control valve providing communication between the source and first servo means of the associated control valve when in the first position and between the first servo means of the associated control valve and the reservoir when in the second position; and a two-position, solenoid-operated, reset valve providing communication between the source and the second servo means associated with each control valve when in a first position and between the second servo means and the reservoir when in a second position.

9. A control system as set forth in claim 8 wherein each control valve includes detent means for holding the control valve in the first and second positions in the absence of fluid pressure in the servo means.

10. A control system as set forth in claim 9 wherein the pilot valves and reset valves are each biased to the second position, each includes a solenoid, and each is moved to its first position upon energization of its solenoid.

11. A control system as set forth in claim 10 wherein the servo means are subjected to the same fluid pressure as the hydraulic functions when their respective valves are in the first positions.

12. A control system as set forth in claim 10 wherein the servo means are subjected to a fluid pressure less than the fluid pressure to which the hydraulic functions are subjected when their respective valves are in the first positions.

* * * * *